(12) United States Patent
Kim (10) Patent No.: US 12,179,596 B2
(45) Date of Patent: Dec. 31, 2024

(54) ENGINE CONNECTION STRUCTURE FOR HYBRID TRANSMISSION

(71) Applicant: HYUNDAI TRANSYS INC., Chungcheongnam-do (KR)

(72) Inventor: Tae Hoon Kim, Gyeonggi-do (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 736 days.

(21) Appl. No.: 17/403,851

(22) Filed: Aug. 16, 2021

(65) Prior Publication Data

US 2022/0056959 A1 Feb. 24, 2022

(30) Foreign Application Priority Data

Aug. 21, 2020 (KR) ........................ 10-2020-0105298

(51) Int. Cl.
*B60K 6/24* (2007.10)
*B60K 6/40* (2007.10)
*F16D 1/10* (2006.01)

(52) U.S. Cl.
CPC ................ *B60K 6/24* (2013.01); *B60K 6/40* (2013.01); *F16D 2001/103* (2013.01)

(58) Field of Classification Search
CPC . B60K 6/24; B60K 6/40; B60K 6/405; B60K 6/48; B60K 2006/4825; B60Y 2200/92; F16D 1/076; F16D 1/104; F16D 1/116; F16D 2001/103; F16F 15/26; F16F 15/262; F16F 15/315; F16F 15/3153; Y02T 10/62; Y10T 403/7033

USPC ........................ 403/359.6; 464/182
See application file for complete search history.

(56) References Cited

U.S. PATENT DOCUMENTS

| | | | |
|---|---|---|---|
| 7,509,802 B2 | 3/2009 | Hammond et al. | |
| 7,954,578 B2 | 6/2011 | Kim et al. | |
| 7,992,661 B2 * | 8/2011 | Nomura | B60K 6/405 |
| | | | 180/65.22 |
| 8,813,935 B2 | 8/2014 | Hart et al. | |
| 9,157,495 B2 * | 10/2015 | Frait | B60K 6/40 |
| 9,243,672 B2 * | 1/2016 | Brevick | B60K 6/40 |
| 11,421,742 B2 * | 8/2022 | Payne | F16D 3/06 |
| 11,498,407 B2 * | 11/2022 | Kim | B60K 6/48 |
| 11,505,055 B2 * | 11/2022 | Payne | B60K 6/40 |
| 11,505,056 B2 * | 11/2022 | Ramsey | B60K 6/405 |
| 2007/0007059 A1 | 1/2007 | Nomura et al. | |
| 2011/0154944 A1 | 6/2011 | Mueller | |
| 2017/0050506 A1 * | 2/2017 | Trinkenschuh | B60K 6/40 |
| 2019/0218921 A1 * | 7/2019 | Breen | F16D 1/108 |
| 2020/0247229 A1 | 8/2020 | Riedisser | |

(Continued)

FOREIGN PATENT DOCUMENTS

| | | | |
|---|---|---|---|
| CN | 113895219 A | 1/2022 | |
| JP | 02118228 A * | 5/1990 | ............ F16F 15/315 |
| JP | 2014184923 A | 10/2014 | |

(Continued)

*Primary Examiner* — Josh Skroupa
(74) *Attorney, Agent, or Firm* — Bridgeway IP Law Group, PLLC; Jihun Kim (57) ABSTRACT

An engine connection structure for a hybrid transmission includes: a connecting mechanism having an edge connected with a mass by a connecting plate and connected to a counter-rotor shaft; and a drive plate being opposite to the connecting mechanism, positioned at a crankshaft, and connecting the mass and the crankshaft to each other.

3 Claims, 7 Drawing Sheets

(56) References Cited

U.S. PATENT DOCUMENTS

2022/0001737 A1    1/2022  Kim

FOREIGN PATENT DOCUMENTS

| KR | 19990037845 U | 10/1999 |
| KR | 20090020791 A | 2/2009 |
| KR | 1020100062640 A | 6/2010 |
| KR | 20160104121 A | 9/2016 |
| WO | 2019076530 A1 | 4/2019 |

* cited by examiner

ENGINE CONNECTION STRUCTURE FOR HYBRID TRANSMISSION

CROSS-REFERENCE TO RELATED APPLICATIONS

This application claims priority to and the benefit of Korean Patent Application No. 10-2020-0105298 filed in the Korean Intellectual Property Office on Aug. 21, 2020, the entire contents of which are incorporated herein by reference.

TECHNICAL FIELD

The present invention relates to an engine connection structure for a hybrid transmission.

BACKGROUND ART

In general, a hybrid vehicle is driven by efficiently combine two or more different kinds of power sources. A hybrid vehicle is a vehicle that is driven by an engine generating torque by burning a fuel (a fossil fuel such as gasoline) and a motor generating torque using power of a battery.

Such a hybrid vehicle is actively studied as a future vehicle that can reduce exhaust gas and improve fuel efficiency by employing not only an engine, but a motor as an assistant power source.

A hybrid vehicle generally uses an engine and a motor, that is, uses a motor having a relatively high low-torque characteristic as a power source at a low speed and uses an engine having a relatively high high-torque characteristic as a power source at a high speed. Accordingly, since the engine using a fossil fuel is stopped and the motor is used in a low-speed period, there is a large effect of improving fuel efficiency and reducing exhaust gas.

A driving apparatus for a hybrid vehicle is operated in operation modes such as an EV (Electric Vehicle) mode that is a pure electric vehicle mode that uses only the torque from a motor for driving and an HEV (Hybrid Electric Vehicle) mode that uses torque from an engine as main power and torque from a motor as assistant power, in which the EV mode is converted into the HEV mode when the engine is started.

Hybrid systems of the related art can be composed of non-expensive parts, as compared with high-voltage systems, and can achieve output at a level close to full hybrid for a short time through a combination of two or motors. Such hybrid systems of the related art is usually classified into P0, P1, P2, P3, and P4, depending on the position of a motor, and each of which shows differences in whether an EV mode is implemented, regenerative braking performance, etc.

Figure 1:
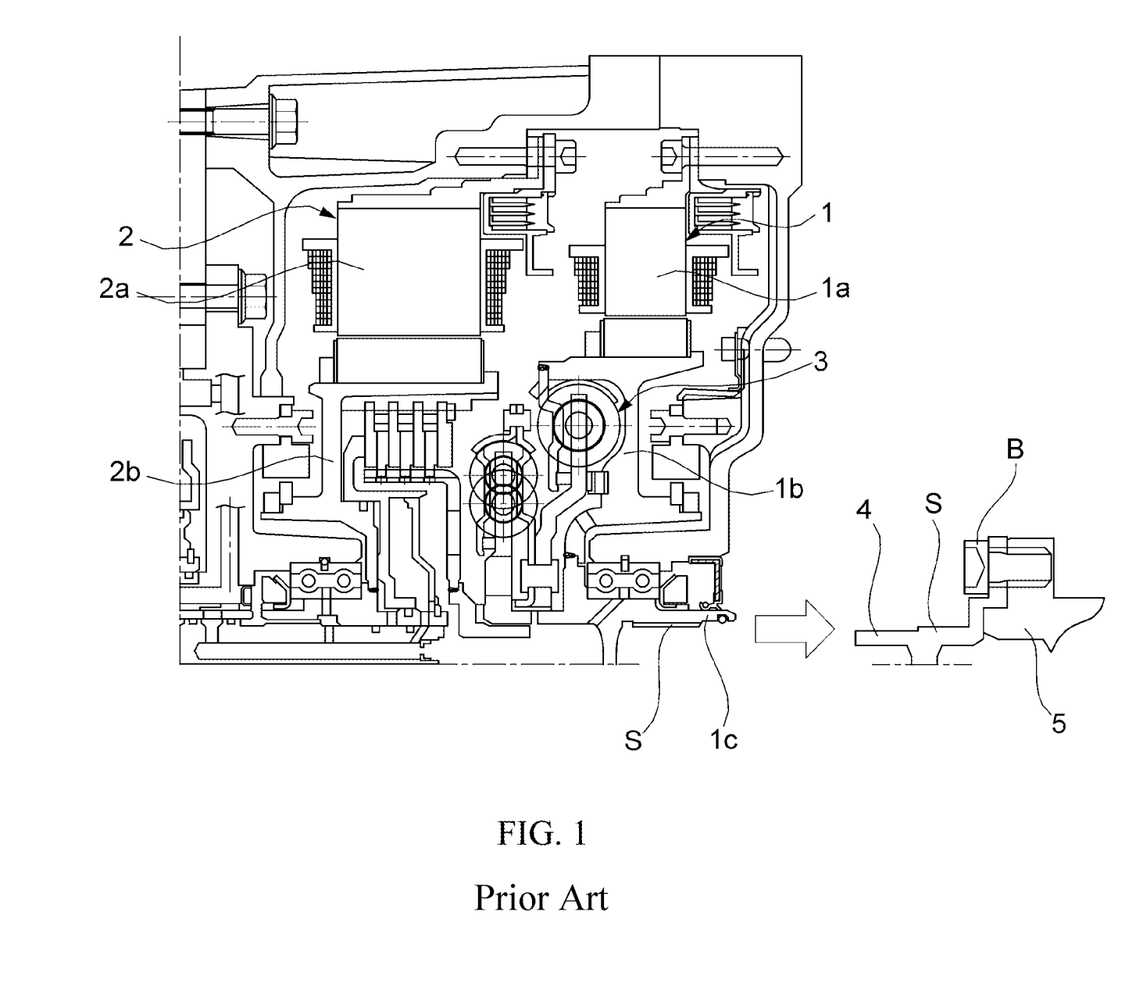
FIG. 1 is a view showing a hybrid transmission of the related art.

FIG. 1 is a view showing a hybrid transmission of the related art. As shown in FIG. 1, a P1 P2 hybrid vehicle of the related art includes a P1 motor 1 including a stator 1a and a rotor 1b, a P2 motor including a stator 2a and a rotor 2b, and a torsional damper 3 disposed between the P1 motor 1 and the P2 motor 2. The torsional damper 3 is connected to the rotor 1a of the P1 motor 1. A rotary shaft 1c and a connecting shaft 4 of the P1 motor 1 is connected to a spline S. The connecting shaft 4 is connected with a crankshaft 5 of an engine by a bolt B.

However, the spines of the rotor shaft and the connecting shaft of the P1 motor of the P1 P2 hybrid transmission of the related art has a backlash for smooth assembly and there are tooth surface gaps of the connecting shaft due to the backlash, so rattle noise is produced when engine power is transmitted.

Accordingly, the present invention provides a mechanism that can connect the connecting shaft of an engine without a gap.

PATENT DOCUMENT (Patent Document 1) Korean Patent Application Publication No. 10-2009-0020791 (published on 2009 Feb. 27)

SUMMARY OF THE INVENTION

In order to solve the problems described above, the present invention provides an engine connection structure for a hybrid transmission, the engine connection structure being able to connect the connecting shaft of an engine without a gap.

In order to achieve the objects described above, an aspect of the present invention provides an engine connection structure for a hybrid transmission. The engine connection structure includes: a connecting mechanism having an edge connected with a mass by a connecting plate, and connected to a counter-rotor shaft; and a drive plate being opposite to the connecting mechanism, positioned at a crankshaft, and connecting the mass and the crankshaft to each other.

The connecting mechanism is a first connecting nut; the first connecting nut is coupled to the outer surface of the rotor shaft protruding toward the crankshaft by a spline; when a locking nut is thread-fastened to the outer surface of the rotor shaft, a surface of the locking nut is in close contact with both of a counter-surface of the first connecting nut and a locking step of the rotor shaft, thereby locking the first connecting nut; and a first step and a second step are formed at a portion of the rotor shaft which is exposed to the crankshaft without being coupled to the first connecting nut, the locking nut is thread-fastened to the outer surface of the first step, the first step has an outer diameter smaller than the outer diameter of the rotor shaft connected with the first connecting nut through a spline, and the second portion having an outer diameter smaller than the first step is connected with the first step, extends toward the crankshaft from the first step, and is fitted in the crankshaft.

The connecting mechanism is a second connecting nut; the second connecting nut is connected to the outer surface of the rotor shaft by a spline; and when a bolt is coupled to a counter-surface of the rotor shaft, a locking plate coupled to the bolt is in close contact with both of the counter-surfaces of the rotor shaft and the second connecting nut, thereby locking the second connecting nut.

A first insertion portion is formed on a counter-surface of the second connecting nut and the locking plate is inserted in the first insertion portion.

The portion connected by a spline between the rotor shaft and the second connecting nut is made watertight by an O-ring pressed to the locking plate.

A boss portion disposed at the center of the drive plate and the crankshaft are connected by a bolt, and the edge of the drive plate and the mass are connected by a bolt.

A housing separator is disposed between the mass, the connecting plate, and a motor, a hub surrounding the rotor shaft is disposed at the center of the housing separator, and an oil seal for watertightness is disposed between the outer surface of the rotor shaft and the inner surface of the hub.

The connecting mechanism is a first connecting shaft; the first connecting shaft has a first extension connected with the rotor shaft by a spline through the inside of the rotor shaft, and a second extension extending toward the crankshaft from the first extension and inserted in the crankshaft; and a locking nut thread-fastened to an exposed portion of the first extension which is exposed to the outside through the inside of the rotor shaft is in close contact with a counter-surface of the rotor shaft, thereby locking the first connecting shaft.

The connecting mechanism is a second connecting shaft; the second connecting shaft is inserted in the rotor shaft and connected with the rotor shaft by a spline; a bolt is fastened to an end surface of the second connecting shaft and a locking plate that is coupled to the bolt comes in contact with both of counter-surfaces of the rotor shaft and the second connecting shaft when being inserted into a second insertion portion formed on a counter-surface of the rotor shaft, thereby locking the second connecting shaft; and the portion connected by a spline between the rotor shaft and the second connecting shaft is made watertight by an O-ring pressed to the locking plate.

The connecting mechanism is a connecting flange, a surface of the connecting flange is connected to a surface of the rotor shaft, a bolt hole is formed along a pitch circle coaxially formed around a center is formed on a surface of the connecting flange, and the connecting flange and the rotor shaft are connected to each other by a bolt fastened in the bolt hole.

The present invention can connect the rotor of a transmission and the connecting shaft of an engine to each other without a gap.

The present invention removes gaps of tooth surfaces of the connecting shaft of an engine, thereby being able to remove rattle noise.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention are described in detail with reference to the accompanying drawings. It should be noted that when components are given reference numerals in drawings, same components are given the same reference numerals even if they are shown in different drawings. In describing the present invention, well-known functions or constructions will not be described in detail since they may unnecessarily obscure the understanding of the present invention. Further, it should be noted that although embodiments of the present invention will be described below, the spirit of the present invention is not limited thereto and may be achieved in various ways by those skilled in the art.

The spines of the rotor shaft and the connecting shaft of a P1 motor of a P1 P2 hybrid transmission of the related art has a backlash for smooth assembly and there are tooth surface gaps of the connecting shaft due to the backlash, so rattle noise is produced when engine power is transmitted. Accordingly, the present invention provides a mechanism that can connect the connecting shaft of an engine without a gap.

First, an engine connection structure for a hybrid transmission according to a first embodiment of the present invention is described.

Figure 2:
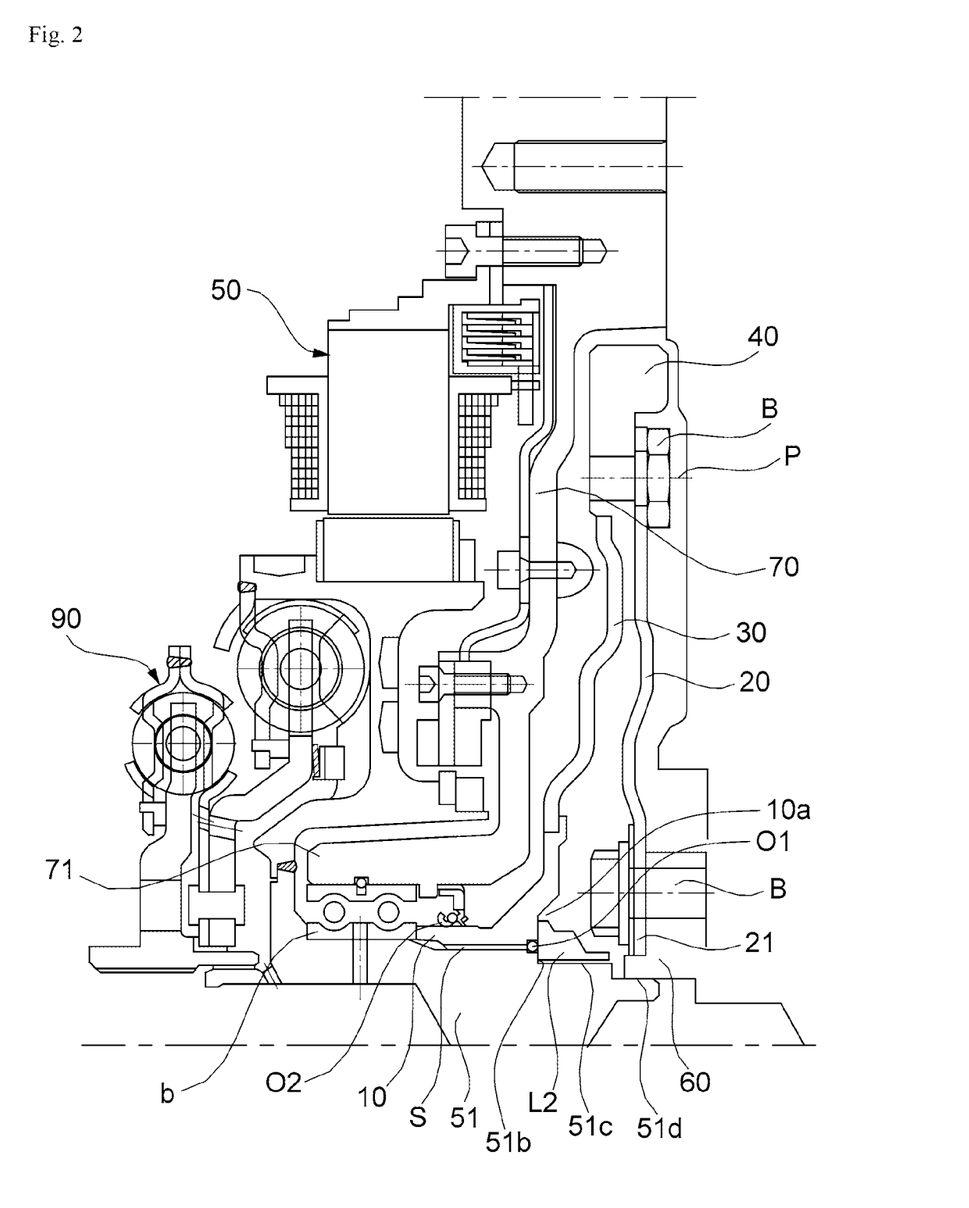
FIG. 2 is a view showing an engine connection structure for a hybrid transmission according to a first embodiment of the present invention.

FIG. 2 is a view showing an engine connection structure for a hybrid transmission according to a first embodiment of the present invention. As shown in FIG. 2, the first embodiment of the present invention includes a connecting mechanism that is implemented by a first connecting nut 10 connected with a rotor shaft 51 of a motor 50 and having an edge connected with a mass 40, and a drive plate 20 connecting the mass 40 and a crankshaft 60 of an engine to each other.

In detail, the first connecting nut 10 is connected to the outer surface of the rotor shaft 51 by a spline S.

When the first connecting nut 10 and the rotor shaft 51 are assembled, a surface of the first connecting nut 10 which faces the crankshaft 60 and a locking end 51b of the rotor shaft 51 are leveled, thereby forming a plane.

With the first connecting nut 10 combined with the rotor shaft 51, a locking nut L2 is coupled to the portion of the rotor shaft 51 which is exposed to the crankshaft 60 not combined with the first connecting nut 10, thereby locking the first connecting nut 10.

The locking nut L2 is inserted in an insertion portion 10a formed on a surface of the first connecting nut 10, when it is assembled, and a surface of the locking unit L2 is in close contact with both of the surface of the first connecting nut 10 which is a counter-surface and the locking end 51b of the rotor shaft 51. Accordingly, the first connecting nut 10 is locked in which it cannot be separated from the rotor shaft 51.

The first connecting nut 10 may be connected with the mass 40 by a connecting plate 30. As an example, the connecting plate 30 may be connected with the first connecting nut 10 and the mass 40 by welding.

The center portion of the connecting plate 30 is connected with the first connecting nut 10 and the edge of the connecting plate 30 is connected with the mass 40.

The mass is a weight body, and when the first connecting nut 10 is rotated with the rotor shaft 51, rotational inertia additionally acts due to the weight of the mass 40, whereby vibration due to rotation can be reduced.

The drive plate 20 is positioned at the crankshaft 60 of the engine with a predetermined gap from the first connecting nut 10. A boss 21 is disposed at the center of the drive plate 20. In assembling, the bolt B is fastened to the boss 21 and the crankshaft 60 with the crankshaft 60 coupled to the center of the boss 21 on the drive plate 20.

The edge of the drive plate 20 is connected with the mass 40. The bolt B is fastened to a pitch circle P of the drive plate 20, thereby being able to firmly connect the drive plate 20 and the mass 40 to each other.

A housing separator 70 is disposed between the motor 50 and the connection structure of the mass 40 and the connecting plate 30. A hub 71 is disposed at the center of the housing separator 70. The hub 71 of the housing separator 70 is assembled in a structure surrounding the rotor shaft 51 and the first connecting nut 10.

With the first connecting nut 10 combined with the rotor shaft 51, an oil seal O2 is disposed between the outer surface of the first connecting nut 10 and the inner surface of the hub 71. Watertightness is achieved between the outer surface of the first connecting nut 10 and the inner surface of the hub 71 by the oil seal O2.

The rotor shaft 51 is rotatably supported by a bearing b mounted inside the hub 71.

A first step 51c and a second step 51d are sequentially formed toward the crankshaft 60 at the coupling portion of the first connecting nut 10. The first step 51c and the second step 51d are portions to which the first connecting nut 10 is not coupled.

In detail, the first step 51c has an outer diameter smaller than the outer diameter of the rotor shaft 51 to which the first connecting nut 10 is coupled.

By forming the first step 51c, a locking step 51b is formed at the boundary between the outer surface of the rotor shaft 51, which is connected with the first connecting nut 10 through a spline, and the first step 51c.

The first step 51c is a corresponding portion to which the locking nut L2 is coupled, and has a width corresponding to the transverse width of the locking nut L2. A thread is formed on the outer surface of the first step 51c, whereby the locking nut L2 can be thread-fastened to the first step 51c.

The second step 51d is connected to the first step 51c and extends toward the crankshaft 60 from the first step 51c. The second step 51d has an outer diameter smaller than the first step 51c.

For example, at least two or more bolts are needed when assembling the connecting plate 30 and the rotor shaft 51 using bolts. However, in the first embodiment of the present invention, the connecting plate 30 and the rotor shaft 51 can be assembled by one first connecting nut 10 connected with the connecting plate 30, so the number of parts to be assembled can be reduced in comparison to using bolts for assembling.

As an example, it is preferable to prevent loosening of the locking nut L2 by coupling the locking nut L2 to the first step 51c and then finish them through caulking with the first connecting nut 10 coupled to the rotor shaft 51.

Since the second step 51d of the rotor shaft 51 is fitted in the crankshaft 60 in assembling, the rotor shaft 51 and the crankshaft 60 can be strongly assembled. Since the rotor shaft 51 and the crankshaft 60 can be strongly assembled, the rotor rotation balance of the motor 50 can be improved.

Since the second step 51d is inserted in the crankshaft 60, both ends of the rotor shaft 51 can be stably supported. Accordingly, concentricity can be stably maintained, and noise and vibration can be reduced.

The portion connected by a spline, with which the locking nut L2 is in close contact, between the first connecting nut 10 and the rotor shaft 51 is made watertight by an O-ring O1. The O-ring O1 is pressed by the locking nut L2, whereby it is in close contact with the spline-connected portion between the first connecting nut 10 and the rotor shaft 51.

Figure 3:
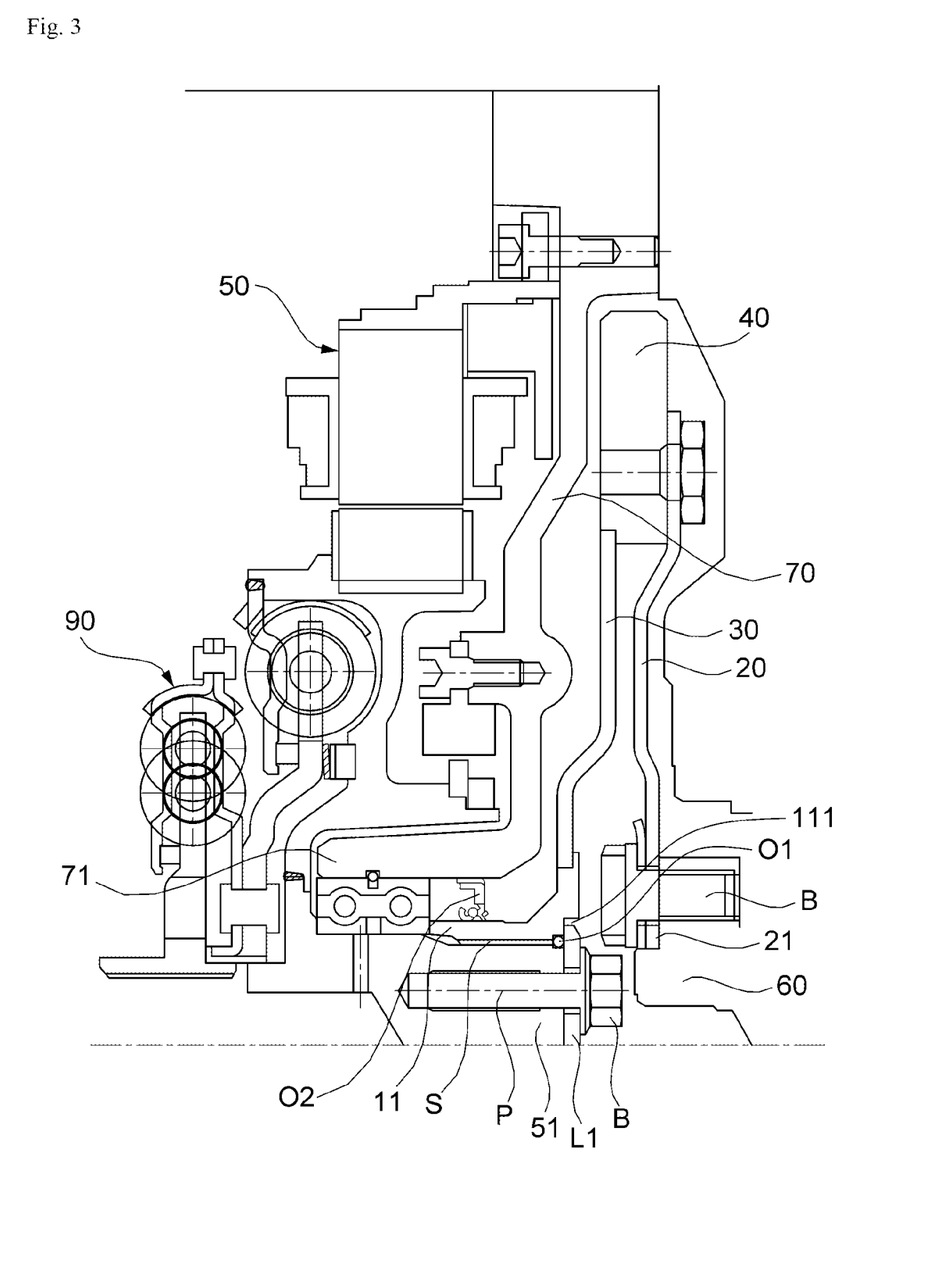
FIG. 3 is a view showing an engine connection structure for a hybrid transmission according to a second embodiment of the present invention.

FIG. 3 is a view showing an engine connection structure for a hybrid transmission according to a second embodiment of the present invention. As shown in FIG. 3, the second embodiment of the present invention includes a connecting mechanism that is implemented by a second connecting nut 11 connected with a rotor shaft 51 of a motor 50 and having an edge connected with a mass 40, and a drive plate 20 connecting the mass 40 and a crankshaft 60 of an engine to each other.

In detail, the second connecting nut 11 is connected to the outer surface of the rotor shaft 51 by a spline S.

A bolt B is fastened to a counter-surface of the rotor shaft 51 which faces the crankshaft 60 with the second connecting nut 11 coupled to the rotor shaft 51. In assembling, the surface of the rotor shaft 51 which faces the crankshaft 60 and the surface of the second connecting nut 11 which faces the crankshaft 60 are leveled, thereby forming a plane.

When the bolt B is fastened, a locking plate L1 coupled to the bolt B is inserted in a first insertion portion 111 formed on the counter-surface of the second connecting nut 11.

In detail, the locking plate L1 comes in close contact with both of the counter-surfaces of the second connecting nut 11 and the rotor shaft 51 when being inserted into the first insertion portion 111, so the second connecting nut 11 can be locked in which the second connecting nut 11 cannot be separated from the rotor shaft 51.

The second connecting nut 11 may be connected with the mass 40 by a connecting plate 30. As an example, the connecting plate 30 may be connected with the second connecting nut 11 and the mass 40 by welding.

In detail, the connecting plate 30 is connected with the second connecting nut 11 such that the second connecting nut 11 is positioned at the center portion. The edge of the connecting plate 30 is connected with the mass 40.

The mass is a weight body, and when the second connecting nut 11 is rotated with the rotor shaft 51, rotational inertia additionally acts due to the weight of the mass 40, whereby vibration due to rotation can be reduced.

A bolt hole is formed on a surface of the rotor shaft 51. The bolt hole is formed along a pitch circle P coaxially constructed around the center of the surface of the rotor shaft 51. In assembling, the bolt B is fastened in the bolt hole, whereby the second connecting nut 11 and the rotor shaft 51 are connected to each other.

The drive plate 20 is positioned at the crankshaft 60 with a predetermined gap from the second connecting nut 11. A boss 21 is disposed at the center portion of the drive plate 20. In assembling, the bolt B is fastened to the boss 21 and the crankshaft 60 with the crankshaft 60 coupled to the center of the boss 21 on the drive plate 20.

The edge of the drive plate 20 is connected with the mass 40. The bolt B is fastened to the pitch circle P of the drive plate 20, thereby firmly connecting the drive plate 20 and the mass 40 to each other.

A housing separator 70 is disposed between the motor 50 and the connection structure of the mass 40 and the connecting plate 30. A hub 71 is disposed at the center of the housing separator 70. The hub 71 of the housing separator 70 is assembled in a structure surrounding the rotor shaft 51.

An oil seal O2 is disposed between the outer surface of the rotor shaft 51 and the inner surface of the hub 71. Watertightness is achieved between the outer surface of the rotor shaft and the inner surface of the hub 71 by the oil seal O2.

Next, an assembly process of the engine connection structure for a hybrid transmission according to the second embodiment of the present invention is described.

Figure 4:
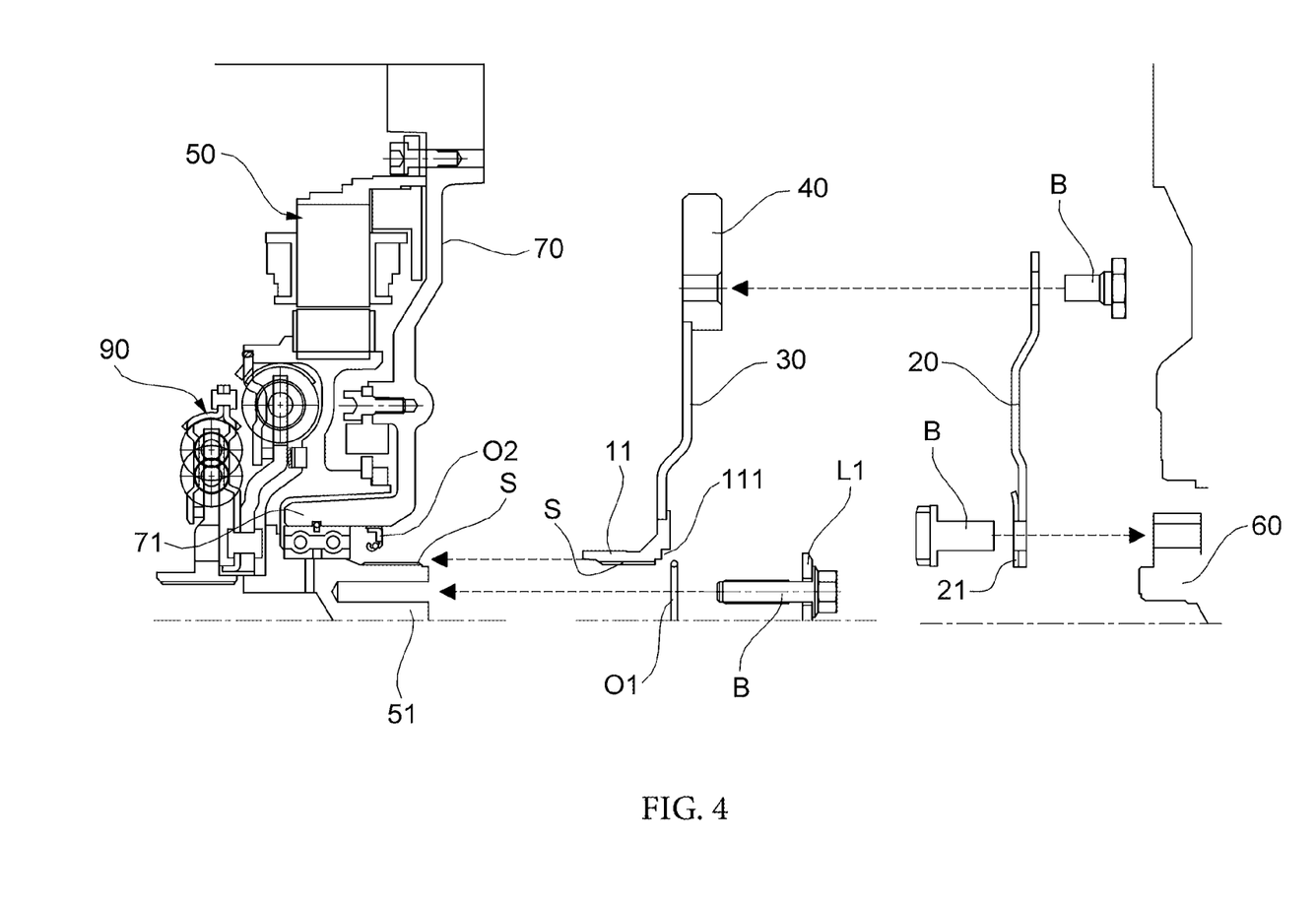
FIG. 4 is a view showing an assembly process according to the second embodiment of the present invention.

FIG. 4 is a view showing an assembly process according to the second embodiment of the present invention. As shown in FIG. 4, the second connecting nut 11 is coupled first to a transmission. In detail, the second connecting nut 11 is forcibly fitted on the outer surface of the rotor shaft 51 that is mounted on a transmission. The rotor shaft 51 and the second connecting nut 11 are connected to each other in a spline S structure.

In this state, the rotor shaft 51 and the second connecting nut 11 are assembled by fastening a bolt B to the rotor shaft 51. When the bolt B is fastened, a locking plate L1 coupled to the bolt B is inserted into a first insertion portion 111 formed the second connecting nut 11 while being pressed by the head of the bolt B.

When the locking plate L1 is inserted into the first insertion portion 111, it come in close contact with both of a surface of the rotor shaft 51 and a surface of the second connecting nut 11. By coupling the locking plate L1, the second connecting nut 11 is locked. Since the locking plate L1 is in close contact with both of the surface of the rotor shaft 51 and the surface of the second connecting nut 11, the second connecting nut 11 is not separated.

The portion connected by a spline S between the rotor shaft 51 and the second connecting nut 11 can be made watertight by an O-ring O1 pressed to the locking plate L1.

The drive plate 20 is coupled to the engine after the rotor shaft 51 and the second connecting nut 11 are assembled.

In detail, the drive plate 20 and the crankshaft 60 are assembled by fastening the bolt B to the boss 21 with the boss 21 of the drive plate 20 positioned on the crankshaft 60.

After the drive plate 20 and the crankshaft 60 are completely assembled, the bolt B is fastened to the edge of the drive plate 20 with the edge of the drive plate 20 in close contact with the mass 40, whereby the drive plate 20 and the mass 40 are assembled.

A bolt hole in which the bolt B can be fastened is formed through the drive plate 20 and the pitch circle P of the mass 40, assembly work can be easily performed.

As described above, since the second connecting nut 11 and the drive plate 20 are separately assembled at a transmission and an engine opposite to the transmission, there is no interference between the second connecting nut 11 and the drive plate 20, so assembly can be quickly performed.

A torsional damper is a device that is installed between an engine and a transmission and reduces torsional vibration that is periodically generated at an input shaft when power is transmitted. A torsional damper 90 is connected with the rotor of the motor 50.

Next, an engine connection structure for a hybrid transmission according to a third embodiment of the present invention is described.

Figure 5:
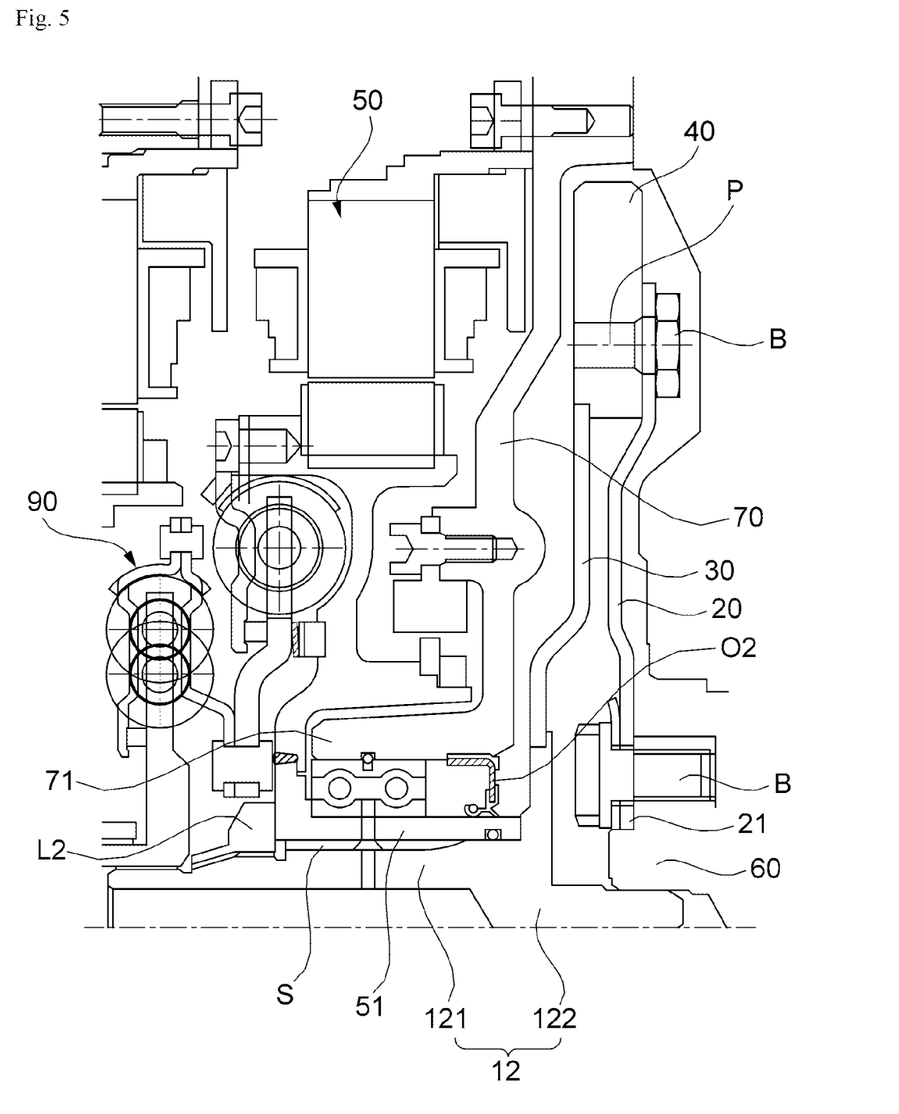
FIG. 5 is a view showing an engine connection structure for a hybrid transmission according to a third embodiment of the present invention.

FIG. 5 is a view showing an engine connection structure for a hybrid transmission according to a third embodiment of the present invention. As shown in FIG. 5, except for the connecting mechanism that is implemented by the first connecting shaft 12 and a corresponding assembly portion of the rotor shaft, the third embodiment of the present invention is the same in another configuration as the second embodiment.

In detail, the first connecting shaft 12 has a first extension 121 extending toward the motor 50 and a second extension 122 extending toward the crankshaft 60.

In detail, the first extension 121 is inserted and connected in the rotor shaft 51 by a spline S. The locking nut L2 is thread-fastened to the exposed portion of the first extension 121 which is exposed to the outside through the inside of the rotor shaft 51.

The locking nut L2 is in close contact with the countersurface of the rotor shaft 51. The first extension 121 cannot be separated from the rotor shaft 51 by the locking nut L2 thread-fastened to the exposed portion of the first extension 121, whereby the first connecting shaft 12 is locked.

The second extension 122 extends toward the crankshaft 60 from the first extension 121. The second extension 122 is inserted in the crankshaft 60.

Next, an engine connection structure for a hybrid transmission according to a fourth embodiment of the present invention is described.

Figure 6:
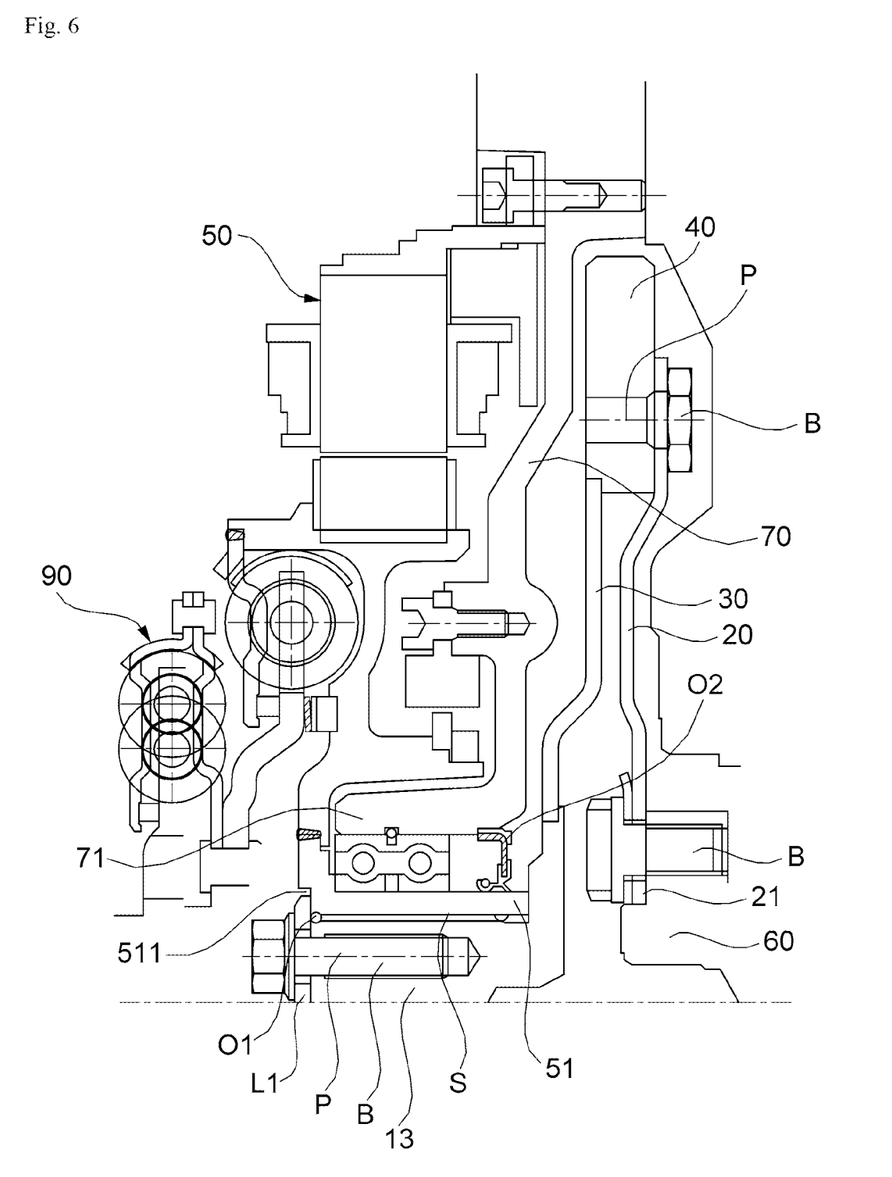
FIG. 6 is a view showing an engine connection structure for a hybrid transmission according to a fourth embodiment of the present invention.

FIG. 6 is a view showing an engine connection structure for a hybrid transmission according to a fourth embodiment of the present invention. As shown in FIG. 6, except for the connecting mechanism that is implemented by the second connecting shaft 13 and a corresponding assembly portion of the rotor shaft, the fourth embodiment of the present invention is the same in another configuration as the second embodiment.

In detail, the second connecting shaft 13 is inserted in the rotor shaft 51 and connected to the rotor shaft 51 by a spline S. The second connecting shaft 13 is inserted in the direction of the motor 50.

A bolt B is fastened to an end surface, which faces the torsional damper 90, of the second connecting shaft 13. In assembling, the end surface of the rotor shaft 51 which faces the torsional damper 90 and the end surface of the second connecting shaft 13 which faces the torsional damper 90 are leveled, thereby forming a plane.

When the bolt B is fastened to the second connecting shaft 13, the locking plate L1 coupled to the bolt B is inserted into a second insertion portion 511 formed on the counter-surface of the rotor shaft 51.

In detail, the locking plate L1 comes in close contact with the end surfaces of the second connecting shaft 13 and the rotor shaft 51 when being inserted into the second insertion portion 511, so the second connecting shaft 13 can be locked in which the second connecting shaft 13 cannot be separated from the rotor shaft 51.

An O-ring O1 is disposed at the portion connected by a spline S between the second connecting shaft 13 and the rotor shaft 51. The O-ring O1 is pressed by the locking plate L1. The portion connected by a spline S between the second connecting shaft 13 and the rotor shaft 51 can be made watertight by the O-ring O1.

Next, an engine connection structure for a hybrid transmission according to a fifth embodiment of the present invention is described.

Figure 7:
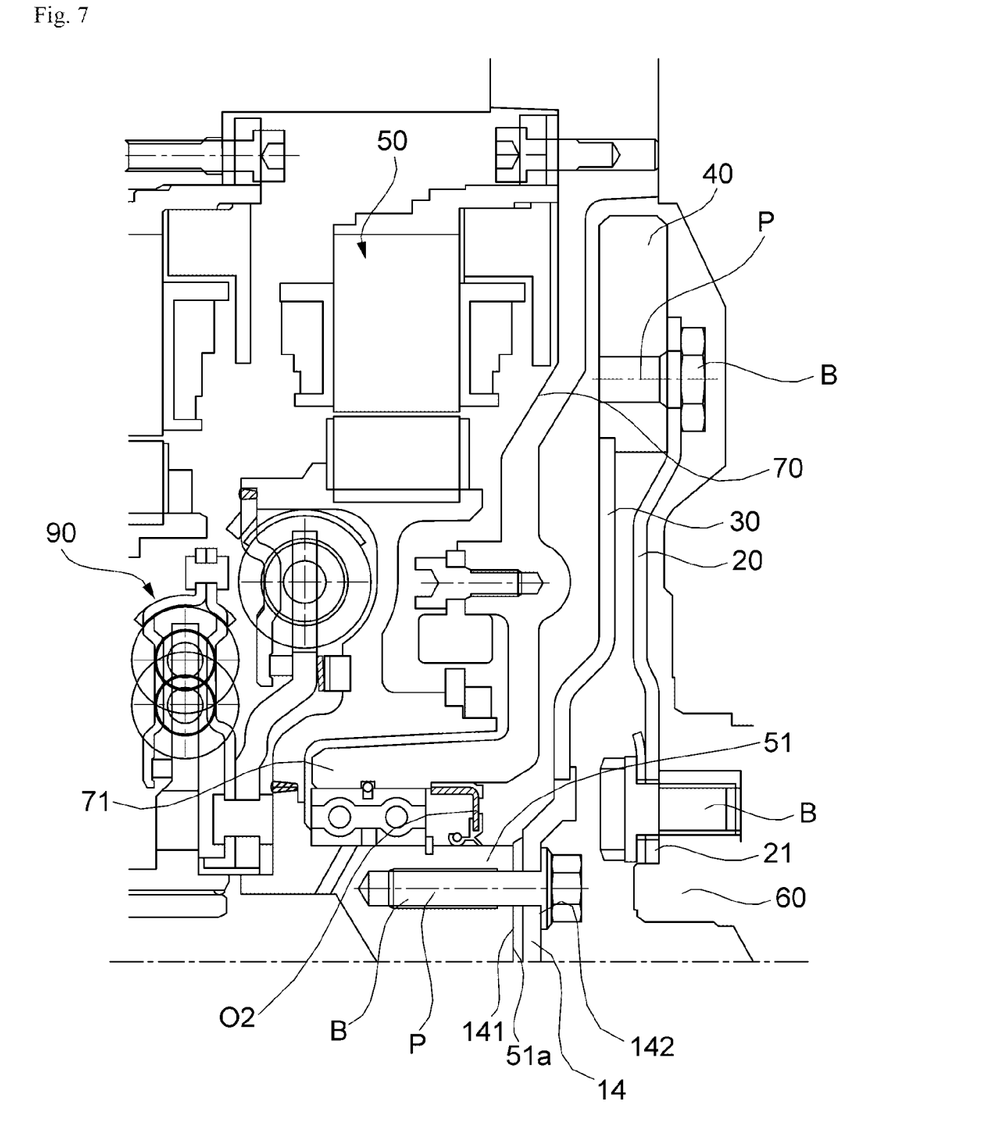
FIG. 7 is a view showing an engine connection structure for a hybrid transmission according to a fifth embodiment of the present invention.

FIG. 7 is a view showing an engine connection structure for a hybrid transmission according to a fifth embodiment of the present invention. As shown in FIG. 7, except for the connecting mechanism that is implemented by a connecting flange 14 and a corresponding assembly portion of the rotor shaft, the fifth embodiment of the present invention is the same in another configuration as the second embodiment.

In detail, a surface 141 of the connecting flange 14 is connected to a surface 51a of the rotor shaft 51. Though not shown in the figure, the surface 141 of the connecting flange 14 and the surface 51a of the rotor shaft 51 may be connected in a spline structure.

A bolt hole 142 is formed on the surface 141 of the connecting flange 14. The bolt hole 142 is formed along a pitch circle P coaxially constructed around the center of the surface 141 of the connecting flange 14. In assembling, the bolt B is fastened in the bolt hole 142, thereby connecting the connecting flange 14 and the rotor shaft 51 to each other.

As described above, the present invention can connect the rotor of a transmission and the connecting shaft of an engine to each other without a gap. Further, the present invention removes tooth surface gaps of the connecting shaft of an engine, thereby being able to remove rattle noise.

The above description merely explains the spirit of the present invention and the present invention may be changed, modified, and replaced in various ways without departing from the spirit of the present invention by those skilled in the art. Accordingly, the embodiments described herein and the accompanying drawings are provided merely not to limit, but to explain the spirit of the present invention, and the spirit of the present invention is not limited by the embodiments and the accompanying drawings. The protective range of the present invention should be construed by the following claims and the scope and spirit of the present invention should be construed as being included in the patent right of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated those other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An engine connection structure for a hybrid transmission, the engine connection structure comprising:
   a connecting mechanism having an edge connected with a mass by a connecting plate, the connecting mechanism being connected to a rotor shaft; and
   a drive plate disposed opposite to the connecting mechanism, positioned at a crankshaft, and connecting the mass and the crankshaft to each other,
   wherein the connecting mechanism and the rotor shaft form a leveled plane along a surface of the connecting mechanism and a locking step of the rotor shaft, and
   wherein, when a locking nut is thread-fastened to an outer surface of the rotor shaft, a surface of the locking nut is configured to be in contact with both of the surface of the connecting mechanism and the locking step of the rotor shaft along the leveled plane, thereby locking the connecting mechanism.

2. The engine connection structure of claim 1,
   wherein the connecting mechanism is a first connecting nut,
   wherein the first connecting nut is coupled to the outer surface of the rotor shaft protruding toward the crankshaft by a spline,
   wherein a first step and a second step are defined at a portion of the rotor shaft which is exposed to the crankshaft without being coupled to the first connecting nut,
   wherein the locking nut is thread-fastened to an outer surface of the first step, the first step having an outer diameter smaller than an outer diameter of the rotor shaft coupled to the first connecting nut through the spline, and
   wherein the second step has an outer diameter smaller than the outer diameter of the first step, the second step being is connected with the first step, the second step extending toward the crankshaft from the first step and being fitted in the crankshaft.

3. The engine connection structure of claim 1,
   wherein a housing separator is disposed between the mass or the connecting plate and a motor,
   wherein a hub surrounding the rotor shaft is disposed at a center of the housing separator, and
   wherein an oil seal to provide watertightness is disposed between an outer surface of the rotor shaft and an inner surface of the hub.

* * * * *